May 4, 1965 LIN KAO 3,182,122

NOISE PROTECTION CIRCUIT

Filed Sept. 22, 1961

INVENTOR.

Lin Kao

BY James T. Baun

ATTY.

United States Patent Office 3,182,122
Patented May 4, 1965

3,182,122
NOISE PROTECTION CIRCUIT
Lin Kao, Evanston, Ill., assignor to Admiral Corporation, Chicago, Ill., a corporation of Delaware
Filed Sept. 22, 1961, Ser. No. 140,065
5 Claims. (Cl. 178—7.3)

This invention relates in general to television receivers and in particular to the television receiver circuitry functioning to remove the synchronizing information from received television signals. More particularly, the invention relates to a transistorized noise protected synchronizing signal separator for a television receiver.

There are various well known circuits in the art for protecting television receiver synchronizing signal separator circuits, hereinafter referred to as sync separators, from the influence of extraneous noise signals. The techniques underlying the most common circuits may be referred to simply as noise gating and noise cancelling (or noise inverting). The circuit of the invention is based upon a concept utilizing both of these techniques to achieve a noise immune sync separator. This circuit is exceptionally well suited for use in a transistorized television receiver, and will be so described although it should be understood that other applications of the invention are contemplated.

The noise gating technique as employed in a well known vacuum tube circuit utilizes a special gating grid in the vacuum tube to which a negatively oriented composite video signal is applied while the signal grid receives the normal positively oriented composite video signal. The gating grid is biased in a positive direction to render the tube conductive except in the presence of large noise peaks which are effective to drive the gating grid sufficiently negative to cut the tube off.

The noise cancelling technique involves triggering a vacuum tube into conduction during the presence of noise exceeding a certain level and adding the resultant output pulse to the composite video signal to effect cancellation of the original noise pulse.

Both of the above systems have inherent drawbacks due to the transconductance of tubes, switching times, effects of loading the video detector, etc., which results in necessary compromises in the noise immunity available. Furthermore, neither circuit lends itself readily to transistor operation. The circuit of the invention combines the above techniques to take advantage of the special properties of transistors in a novel manner to produce a highly noise immune sync separator.

A general object of this invention is to provide a simple noise protection circuit for a television receiver sync separator.

Another object of this invention is to provide a noise protection circuit for a television receiver sync separator, which circuit combines the principles of noise invention and noise gating.

A further object of this invention is to provide a novel noise protection circuit for a transistorized television receiver.

Still another object of this invention is to provide a noise protection circuit for a television receiver sync separator, which utilizes a switching transistor for developing a large cut off potential responsive to signals exceeding the synchronizing signal level.

Figure 1:
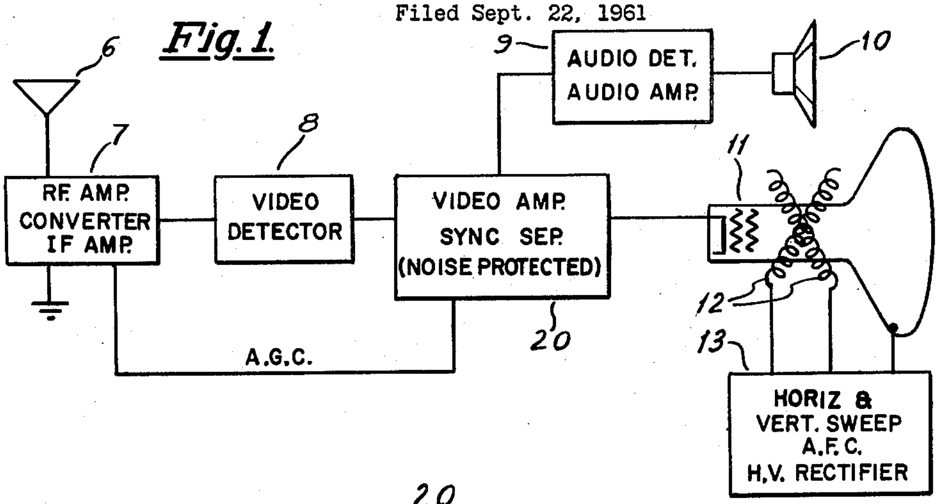
Figure 2:
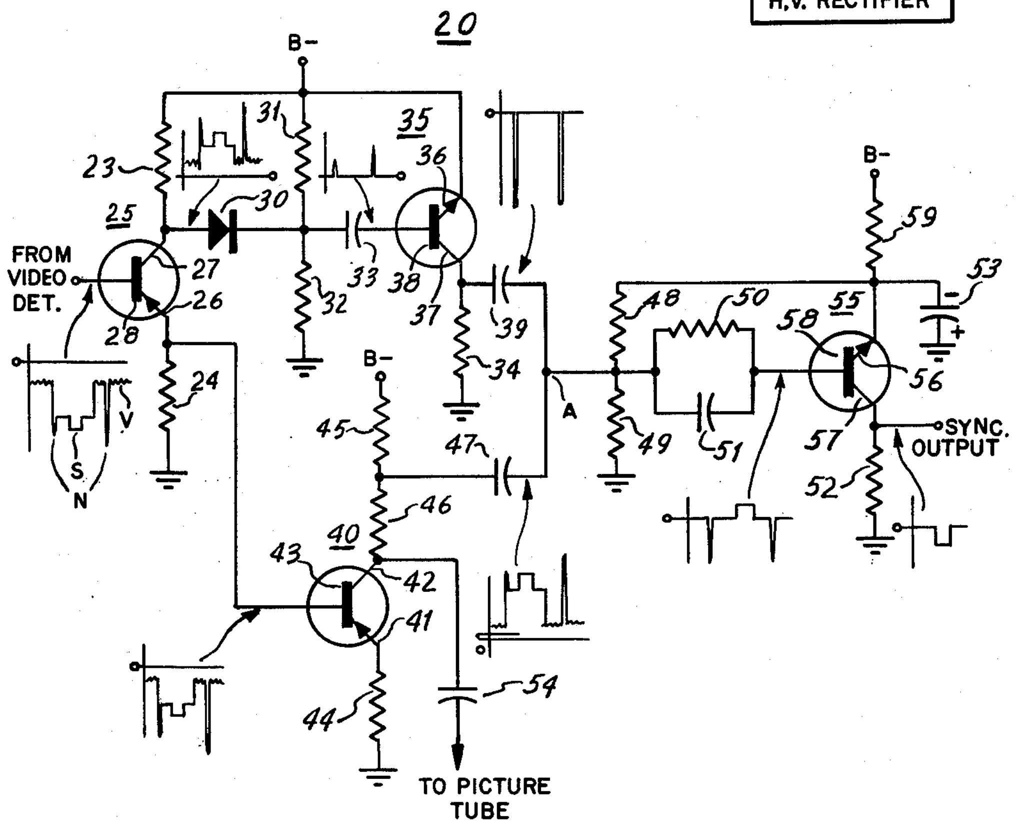

Other objects of this invention will become apparent upon reading the following specification in conjunction with the drawings in which FIG. 1 is a block diagram of a television receiver and FIG. 2 is a schematic diagram of a portion of the television receiver of FIG. 1, in which the invention is incorporated.

Referring now to FIG. 1, an antenna 6 receives transmitted television signals and couples these signals to block 7 which may contain an RF amplifier, a converter, and an IF amplifier. The elements in block 7 are conventional and operate to select a particular television signal, convert this television signal to a common intermediate frequency (IF) signal and provide amplification therefor. The IF signal is coupled to a video detector 8 which develops a composite video signal containing video and audio information components, synchronizing signal components separated in magnitude from said video and audio components and fortuitous noise components having magnitudes often greatly exceeding that of the synchronizing signal components. The composite video signal is coupled to block 20 which contains one or more stages of video amplification and synchronizing signal separator means for removing the synchronizing signals from the composite video signals. An audio detector and audio amplifier are coupled to the video amplifier and serve to recover the audio information contained in the composite video signal. This information is then fed to a speaker 10 which recreates the acoustical accompaniment of the televised program.

Block 20 is also connected to block 13 which contains horizontal and vertical sweep circuits, an automatic frequency control circuit for synchronizing the receiver line and field scanning frequency with those of the television signal and a high voltage rectifier circuit for developing the large direct current potential required by the television picture tube. The horizontal and vertical circuits are coupled to deflection windings 12 on picture tube 11 and the output of the video amplifier is coupled to the cathode of picture tube 11. These portions function in a well known manner to recreate the visual portion of the televised program on the picture tube viewing screen.

Additionally, an automatic gain control lead couples block 20 with block 7. A control potential is developed, responsive to the television signal strength, and is placed on this lead to control the amplification of the circuits in block 7 to maintain the level of the composite video signal at video detector 8 relatively constant despite television signal strength variations.

FIG. 2 is a schematic diagram of the circuitry in block 20 which embodies the invention. A first video amplifier transistor 25 of the PNP type, having an emitter 26, a collector 27 and a base 28, is provided for amplifying the negatively oriented composite video signal in the output of the video detector. A representative wave form of this output is shown at the base of transistor 25 and includes video information V, a synchronizing pulse S, and noise components N. A collector load resistor 23 is connected from a source of potential B— to collector 27 and an emitter resistor 24 is connected between emitter 26 and ground. The input signal to transistor 25 is negatively oriented and the output signal appearing across collector resistor 23 is therefore positively oriented, whereas the output signal appearing across emitter resistor 24 is in phase with the input signal. Various representative signal wave forms are shown on the drawing to facilitate an understanding of the circuit operation.

A second video amplifier transistor 40 of the PNP type having an emitter 41, a collector 42, and a base 43 is connected to emitter resistor 24. The collector of transistor 40 is coupled to B— through a pair of resistors 45 and 46 and the amplified composite video signal developed thereacross is coupled by a capacitor 54 to the picture tube to control the beam modulation therein. It will be noted that the output wave form of transistor 40 is positively oriented. Emitter resistor 44 provides proper biasing for transistor 40. The junction of collector resistors 45 and 46 is coupled through a capacitor 47 to a junction A. It will be appreciated that the provision of two collector resistors is a matter of design choice and has no effect upon the merits of the invention.

Sync separator transistor 55 is of the NPN type having an emitter 56, a collector 57, and a base 58 and is provided for separating the synchronizing signal components from the video information components on the basis of magnitude. Resistor 59 and filter capacitor 53 merely serve to reduce the operating potential for the synch separator and will be recognized as also being a matter of design choice. A pair of resistors 48 and 49 connected to resistor 59 comprise a voltage divider for properly biasing the synch separator. The junction of these resistors is connected through a parallel combination of resistor 50 and capacitor 51 to base 58 of transistor 55. These parallelly connected elements cooperate in establishing the operating conditions for transistor 55 such that only signals having magnitudes corresponding to those of the synchronizing components are amplified. An emitter load resistor 52 is provided for transistor 55, across which resistor the separated synchronizing signal components appear. The circuit thus far described essentially comprises a first and second video amplifier and a sync separator, all arranged in a fairly conventional manner.

Referring back to collector load resistor 23 of video amplifier 25, it will be recalled that a positively oriented composite video signal was developed thereacross. A pair of resistors 31 and 32 are connected from B— to ground, hence establishing a fixed potential at their junction. A diode 30 is connected between this junction and collector 27 of transistor 25. Diode 30 is poled in such a manner that it only conducts when the voltage of collector 27 is more positive than the voltage at the junction of resistors 31 and 32. It will be remembered that the AGC circuit (not shown in this figure) is responsible for maintaining the signal level output at the video detector at a relatively constant level. Consequently, resistors 31 and 32 may be selected such that diode 30 is only driven into conduction for signals which are a predetermined small amount larger than the synchronizing signal components, i.e., noise signals. A switching transistor 35 of the NPN type has its base 38 coupled through a capacitor 33 to the junction of resistors 31 and 32. Emitter 36 of transistor 35 is directly connected to B— and collector 37 is connected through a collector resistor 34 to ground. Collector 37 is also coupled through a coupling capacitor 39 to junction A.

Transistor 35 is thus normally in a non-conductive state and substantially zero potential exists across collector load resistor 34. However, upon conduction of diode 30 responsive to a noise signal, a positive pulse of current is coupled through capacitor 33 to base 38 of transistor 35, which pulse of current rapidly drives transistor 35 into full conduction. Since the saturation resistance of transistors is very low, substantially full B— potential appears across load resistor 34 when transistor 35 is driven into conduction. The switching of transistor 35 responsive to a noise impulse results in large negative pulse of potential at junction A. This large negative pulse of potential is synchronized with the positive noise pulse in the signal output of transistor 40. An algebraic addition of these two pulses occurs at junction A with the result that the positive going noise pulse is overcancelled. The overcancelled pulse (now a large negative pulse) is effective to completely cut off synchronizing signal separator 55 for the duration thereof and consequently, the output of transistor 55 contains no noise pulses, only separated synchronizing pulses.

The effectiveness of the circuit is enhanced considerably due to the low saturation resistance and short switching time of transistor 35. These characteristics enable substantially full B— cancellation potential to exist at junction A even for noise pulses which barely exceed the threshold of conduction of diode 30. These results have not been readily obtainable with prior art circuits.

What has been described is a novel noise protection circuit for a transistorized television receiver. It will be appreciated that while the circuit and various components therein have been shown to be of specific types and configuration, those skilled in the art will readily perceive various departures and modifications therefrom within the scope of the invention as set forth in the attached claims.

What is claimed is:

1. In a television receiver; a video detector for developing a first polarity composite video signal including video components, synchronizing components having magnitudes greater than said video components and fortuitous noise components exceeding the magnitude of said synchronizing components; a transistor amplifier for amplifying said composite video signal; means including an emitter resistor in said transistor amplifier for developing a second polarity replica of said composite video signal; means including a collector resistor in said transistor amplifier for developing a first polarity replica of said composite signal; additional means for further amplifying said first polarity oriented replica; a transistor switch having an input circuit and an output circuit; network means interposed between said collector resistor and the input circuit of said transistor switch for maintaining said transistor switch in an "off" condition except during occurrence of said noise components, the output circuit of said transistor switch developing a large first polarity potential upon said switch being driven into an "on" condition, said transistor drawing substantially full collector saturation current responsive to said fortuitous noise components having magnitudes exceeding a certain level; a common junction coupling the output of said transistor switch with the output of said additional means; and separating means coupled to said common junction for separating said synchronizing components from said video components, whereby said separating means is disabled when said transistor switch is in an "on" condition to insure that ony separated reference components appear in the output of said separating means.

2. In combination in a television receiver; a video detector for developing a negatively oriented composite video signal from a received television signal, said composite video signal including periodic reference components, fortuitous noise components and video information components, said periodic reference components being greater in magnitude than the largest of said video information components, said fortuitous noise components having magnitudes often exceeding said periodic reference components; separating means for separating said periodic reference components from said video components on the basis of amplitude; means for supplying a positively oriented alternating current replica of said composite video signal to said separating means; and means for positively disabling said separating means in the presence of noise components having magnitudes in excess of the magnitude of said periodic reference components comprising; a transistor switch coupled to said video detector for developing a large negatively oriented potential responsive to, and substantially independent of, the magnitude of noise components exceeding the magnitude of said periodic reference components; and means for alternating current coupling said developed potential to said separating means to thereby disable to same during occurrence of said last mentioned noise components.

3. In combination in a television receiver; a video detector for developing a negatively oriented composite video signal including video components, periodic reference components having magnitudes greater than said video components and fortuitous noise components having magnitudes in excess of said periodic reference components; separating means for separating said periodic reference components from said video components on the basis of magnitude; means for supplying a positively oriented replica of said composite video signal to said separating means; means including a switching transistor having a bias network connected to energize the transistor only for signals exceeding the level of said periodic reference components, said transistor being driven into collector current saturation and developing a large negative potential only in response to said noise components, said negative potential being substantially independent of the amount by which said noise components exceed the magnitude of said periodic reference components; and means for alternating current coupling the output of said transistor to said separating means to thereby positively disable said separating means during occurrence of said noise components.

4. In a television receiver for receiving a television signal and including a video detector for developing therefrom a negatively oriented composite video signal including periodic reference components and undesired spurious noise components exceeding the magnitude of said reference components; separating means for removing said reference components from said composite video signal; first transistor means coupled to said video detector for supplying a pair of mirror image replicas of said composite video signal; second transistor means for amplifying the negatively oriented one of said mirror image replicas and for supplying a positively oriented alternating current amplified signal to a junction, said second transistor means limiting its maximum signal output to a predetermined level; transistor switch means having an input circuit connected to receive the positively oriented one of said mirror image replicas; and means, including a diode, in said input circuit for biasing said transistor switch into a non-conductive state for all signals of a magnitude equal to or less than the magnitude of said periodic reference components, said transistor switch rapidly being driven into collector current saturation responsive to said noise components and developing a large negative potential, said large negative potential being much greater in magnitude than signals of said predetermined level; means for alternating current coupling the output of said transistor switch to said junction; and means for connecting said junction to said separating means whereby said separating means is always cut off during occurrence of said noise components.

5. In a television receiver; a video detector for developing a negatively oriented composite video signal including video components, synchronizing components having magnitudes greater than said video components and fortuitous noise components exceeding the magnitude of said synchronizing components; a transistor amplifier for amplifying said composite video signal; means including an emitter resistor in said transistor amplifier for developing a negatively oriented replica of said composite video signal; means including a collector resistor in said transistor amplifier for developing a positively oriented replica of said composite signal; amplifying means for further amplifying said negatively oriented replica; a high gain switching transistor having an input circuit and an output circuit; network means including a voltage divider and a diode interposed between said collector resistor and the input circuit of said switching transistor for normally maintaining said switching transistor in its non-conductive state and for driving said switching transistor into conduction current saturation during occurrence of said noise components, the output circuit of said switching transistor developing a large negative potential when said switching transistor is in its current saturation state; means for alternating current coupling the output of said switching transistor and the output of said amplifying means; and separating means for separating said synchronizing components from said video components, said last mentioned means being alternating current coupled to said output circuits whereby said separating means is cut off whenever said switching transistor is in a conductive state, said switching transistor being driven into saturation by noise components and delivering a uniform negative output potential substantially irrespective of the magnitude of said noise components.

References Cited by the Examiner

UNITED STATES PATENTS

| | | | |
|---|---|---|---|
| 2,717,920 | 9/55 | Avins | 325—473 XR |
| 2,736,769 | 2/56 | Macovski | 178—7.3 |

FOREIGN PATENTS

| | | |
|---|---|---|
| 577,683 | 6/59 | Canada. |
| 1,229,816 | 9/60 | France. |

OTHER REFERENCES

Transistors in Radio, Television, and Electronics, M. S. Kiver, second edition, copyright 1959, McGraw-Hill, pages 227, 228.

DAVID G. REDINBAUGH, *Primary Examiner.*

JOHN P. WILDMAN, *Examiner.*